United States Patent
Fouda-Onana et al.

(10) Patent No.: US 9,391,331 B2
(45) Date of Patent: Jul. 12, 2016

(54) PROCESS FOR GROWING METAL PARTICLES BY ELECTROPLATING WITH IN SITU INHIBITION

(75) Inventors: Frederic Fouda-Onana, Le Moule (GP); Nicolas Guillet, Chatuzange Le Goubet (FR)

(73) Assignees: Commissariat a L'Energie Atomique et aux Energies Alternatives, Paris (FR); King Saud University, Riyadh (SA)

( * ) Notice: Subject to any disclaimer, the term of this patent is extended or adjusted under 35 U.S.C. 154(b) by 49 days.

(21) Appl. No.: 14/114,515

(22) PCT Filed: Apr. 18, 2012

(86) PCT No.: PCT/EP2012/057087
§ 371 (c)(1),
(2), (4) Date: Oct. 28, 2013

(87) PCT Pub. No.: WO2012/146520
PCT Pub. Date: Nov. 1, 2012

(65) Prior Publication Data
US 2014/0048419 A1    Feb. 20, 2014

(30) Foreign Application Priority Data
Apr. 27, 2011 (FR) .................................. 11 53606

(51) Int. Cl.
*C25D 3/50* (2006.01)
*C25D 3/52* (2006.01)
(Continued)

(52) U.S. Cl.
CPC .............. *H01M 4/8853* (2013.01); *C25D 3/50* (2013.01); *C25D 3/52* (2013.01); *H01M 4/8807* (2013.01);
(Continued)

(58) Field of Classification Search
None
See application file for complete search history.

(56) References Cited

U.S. PATENT DOCUMENTS 1,993,623 A * 3/1935 Raper ........................... 205/265
4,183,790 A * 1/1980 Janjua et al. .................. 205/104
(Continued)

FOREIGN PATENT DOCUMENTS

EP 2261398 A1 * 12/2010 ............... C25D 5/02
JP 2003-036897 A 2/2003
(Continued)

OTHER PUBLICATIONS

Oniciu et al, Some fundamental aspects of levelling and brightening in metal electrodeposition, Journal of Applied Electrochemistry, vol. 21, No. 7, Jul. 1991, pp. 565-574.*
(Continued)

*Primary Examiner* — Harry D Wilkins, III
(74) *Attorney, Agent, or Firm* — Baker & Hostetler LLP

(57) ABSTRACT

A process for manufacturing a catalytic, electrically conductive electrode based on metal particles, comprises: a step of electroplating with a metal salt to form the said metal particles at the surface of an electrode, characterized in that the step of electroplating of the metal salt is performed in the presence of a blocking chemical species with a high power of absorption onto the surface of the said metal particles and with an oxidation potential higher than the reduction potential of the said metal salt such that the blocking chemical species conserves its blocking power during the reduction reaction of the said metal salt, and so as to reduce the size of the metal particles formed, constituting the said catalytic, electrically conductive electrode; and, a step of desorption of the blocking chemical species.

10 Claims, 3 Drawing Sheets

(51) Int. Cl.
*H01M 4/88* (2006.01)
*H01M 4/92* (2006.01)
*H01M 8/10* (2016.01)

(52) U.S. Cl.
CPC ...... *H01M 4/921* (2013.01); *H01M 2008/1095* (2013.01); *Y02E 60/50* (2013.01); *Y02E 60/522* (2013.01)

(56) References Cited

U.S. PATENT DOCUMENTS

| | | | | |
|---|---|---|---|---|
| 4,401,527 | A | * | 8/1983 | Duva et al. .................. 205/265 |
| 4,541,905 | A | * | 9/1985 | Kuwana et al. .............. 205/105 |
| 4,778,574 | A | * | 10/1988 | Mathe et al. ................. 205/265 |
| 5,084,144 | A | | 1/1992 | Reddy et al. |
| 5,529,680 | A | * | 6/1996 | Kitada et al. .................. 205/67 |
| 5,620,583 | A | * | 4/1997 | Kuhn et al. .................. 205/264 |
| 6,863,795 | B2 | * | 3/2005 | Teerlinck et al. ............. 205/210 |
| 2004/0161928 | A1 | * | 8/2004 | Arita et al. .................... 438/674 |
| 2006/0040157 | A1 | | 2/2006 | Popov et al. |
| 2008/0023218 | A1 | * | 1/2008 | Nishu et al. ................... 174/257 |
| 2008/0251390 | A1 | | 10/2008 | Tsai et al. |
| 2009/0202871 | A1 | | 8/2009 | Bose et al. |
| 2010/0294669 | A1 | * | 11/2010 | Abys et al. ................... 205/239 |
| 2012/0175534 | A1 | * | 7/2012 | Jung et al. .................. 250/515.1 |
| 2013/0184146 | A1 | * | 7/2013 | Sun et al. .......................... 502/5 |
| 2014/0155664 | A1 | * | 6/2014 | Dufresne ............. B01J 37/0225 585/274 |

FOREIGN PATENT DOCUMENTS

| | | |
|---|---|---|
| JP | 2004-270028 A | 9/2004 |
| WO | 2007110246 A2 | 10/2007 |

OTHER PUBLICATIONS

Ernur et al, The Impact of Annealing on the Corrosion Mechanism of Copper Films, MRS Proceedings, vol. 781, 2003 MRS Spring Meeting—Symposium Z—Mechanisms in Electrochemical Deposition and Corrosion, pp. Z2.7.1-Z2.7.7.*

Y. Garsany et al., "Impact of Sulfur Dioxide on the Performance of the PEMFC Cathodes", ECS Transitions, 2006, pp. 685-694, vol. 3, No. 1, The Electrochemical Society.

R. Mohtadi et al., "The Effect of Temperature on the Adsorption Rate of Hydrogen Sulfide on Pt Anodes in a PEMFC", 2005, pp. 37-42, vol. 56, Applied Catalysis B: Environmental.

J. M. Moore et al., "The Effects of Battlefield Contaminants on PEMFC Performance", 2000, pp. 254-260, vol. 85, Journal of Power Sources.

J. Fu et al., "Potential Dependence of Sulfur Dioxide Poisoning and Oxidation at the Cathode of Proton Exchange Membrane Fuel Cells", Journal of Power Sources, 2009, pp. 32-38, vol. 187.

E.J. Taylor, et al., "Preparation of High-Platinum-Utilization Gas Diffusion Electrodes for Proton-Exchange-Membrane Fuel Cells", J. Electrochem. Soc., May 1992, pp. L45-L46, vol. 139, No. 5, The Electrochemical Society, Inc.

Subasri M. Ayyadurai, et al., "Novel PEMFC Cathodes Prepared by Pulse Deposition", Journal of the Electrochemical Society, 2007, pp. B1063-B1073, vol. 154, No. 10, The Electrochemical Society, Inc.

Hansung Kim, et al., "Development of Novel Method of Preparation of PEMFC Electrodes", Electrochemical and Solid-State Letters, 2004, pp. A71-A74, vol. 7, No. 7, The Electrochemical Society, Inc.

W. Zhu, et al., "Buckpaper-based Catalytic Electrodes for Improving Platinum Utilization and PEMFC's Performance", Electrochimica Acta, 2010, pp. 2555-2560, Elsevier.

Jean St.-Pierre, et al., "PEMFC Contamination Model: Competitive Adsorption Demonstrated with NO2", Journal of the Electrochemical Society, 2008, pp. B315-B320, vol. 155, No. 4, The Electrochemical Society.

R. Mohtadi, et al., "Effects of Hydrogen Sulfide on the Performance of the PEMFC", Electrochemical and Solid-State Letters, 2003, pp. A272-A274, vol. 6, No. 12, The Electrochemical Society, Inc.

Jeremy J. Pietron, et al, "Impact Sulfur Dioxide on the Performance of PEMFC Cathodes", ECS Transactions I, 2006, pp. 103-109, vol. 1, No. 8, The Electrochemical Society.

Office Action in Japanese Patent Application No. 2012-506822, dated Feb. 2, 2016.

* cited by examiner

PROCESS FOR GROWING METAL PARTICLES BY ELECTROPLATING WITH IN SITU INHIBITION

CROSS-REFERENCE TO RELATED APPLICATIONS

This application is a National Stage of International patent application PCT/EP2012/057087, filed on Apr. 18, 2012, which claims priority to foreign French patent application No. FR 1153606, filed on Apr. 27, 2011, the disclosures of which are incorporated by reference in their entirety.

FIELD OF THE INVENTION

The field of the invention is that of processes for depositing metal particles electrochemically, used notably for the formation of electrodes for fuel cells or for any type of electrode used in the majority of electrochemical reactions (electrosynthesis, electrolysis of water, electrochemical sensors, supercapacitors, etc.) whose active electrode surface must be large.

BACKGROUND

One of the curbs on the development of proton-exchange membrane low-temperature fuel cells (PEMFC) lies in the need to use materials that are active enough to catalyse oxygen reduction reactions (ORR) and hydrogen oxidation reactions (HOR).

At the present time, the best catalyst that has been found for these two reactions is platinum and some of its alloys with transition metals (Ru, Ni, Co, etc.). To obtain optimum performance under operating conditions that are compatible with common applications, it is currently necessary to fill the electrodes with relatively large amounts of noble metal (0.1-0.3 mg/cm$^2$).

The cost of the noble metal alone used in fuel cells is currently estimated at 50% of the cost of the stack and between 20% and 25% of the total cost of the fuel cell system.

Consequently, reducing the amount of platinum, while at the same time keeping the performance constant for cells, is a major challenge in research and development on catalysts for the cathode of fuel cells. In the face of this problem, one of the strategies consists in placing the platinum only in zones where its activity will be maximal. Since the electrochemical reactions concerned simultaneously involve reagent gases, electrons and protons, these zones have at least one ionic contact and one electrical contact. In order for a catalytic site to be fully effective, it also needs to be accessible to the reagent gas (hydrogen or oxygen). One of the options for satisfying these two criteria consists in using an electrochemical deposit, also known as an electroplating. The method consists in applying a galvanic signal or a signal at controlled potential in order to reduce the metal salt (platinum in ionic form PtCl$_6^{2-}$ for example) to metal particles deposited on the electrode which serves as substrate for the deposit.

The reaction balance for the deposition of platinum is written as follows:

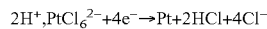

$$2H^+, PtCl_6^{2-} + 4e^- \rightarrow Pt + 2HCl + 4Cl^-$$

Although the technique has been used for many years, as witnessed by the studies described in Vilimbi N. R. K., Anderson E. B., and Taylor E. J. U.S. Pat. No. 5,084,144, or in: E. J. Taylor, E. B. Anderson, N. R. K. Vilambi, *Journal of the Electrochemical Society* 1992, 139 L45-L46., the method has not ceased to be studied to improve the performance of these electrodes prepared by electroplating. Among the major studies on the subject, mention may be made of the following articles: S. M. Ayyadurai, Y. S. Choi, P. Ganesan, S. P. Kumaraguru, B. N. Popov, *Journal of the Electrochemical Society* 2007, 154 B1063-B1073, H. Kim, B. N. Popov, Electrochemical and Solid State Letters 2004, 7 A71-A74, in which the electrodes charged with 0.32 mg$_{Pt}$/cm$^2$ made it possible to achieve a current density of 900 mA/cm$^2$ at 700 mV by running the cell with H$_2$—O$_2$ at 80° C. under atmospheric pressure.

However, in many cases, it appears that the size of the particles of these electrodes is at most 10 times coarser than those prepared via the standard chemical method. This phenomenon is very detrimental to the catalytic activity, since the reactions involved are reactions that take place at the surface of the metal particles and at constant charge, the developed surface of these particles is proportionately smaller the larger the diameter of the particles. There is thus a risk of losing the gain in efficacy associated with the optimum placing of the particles if they become too coarse.

One of the major objects in the optimization of the electroplating technique is thus to manage to reduce the size of the particles to diameters that are comparable to those obtained via chemical or physical synthesis, i.e. less than 10 nm. Admittedly, the prior art features studies in which electrodes have been prepared by electroplating with particles whose size is of the order of a few nanometres, however, in many cases, the charge is very low and does not make it possible to be used as a fuel cell cathode (a charge of the order of 150 to 200 µg$_{Pt}$/cm$^2$ is necessary for optimum functioning). Another method for reducing the particle size consists in adding a viscous agent to the electrolytic bath in order to curb the diffusion of the metal ions, which makes it possible to significantly reduce the particle size (by 5 to 30 nm) as described in the following articles: Ayyadurai, Y. S. Choi, P. Ganesan, S. P. Kumaraguru, B. N. Popov, *Journal of the Electrochemical Society* 2007, 154 B1063-B1073 or W. Zhu, D. Ku, J. P. Zheng, Z. Liang, B. Wang, C. Zhang, S. Walsh, G. Au, E. J. Plichta, *Electrochimica Acta* 2010, 55 2555-2560.

This alternative gives very interesting results but poses the problem of cleaning these viscous agents (glycerol or ethylene glycol) from the electrodes. Specifically, their presence in high concentration in the diffusion layer of the electrode not only curbs the diffusion of the Pt ions during the electroplating, but also the access of oxygen to the active sites, and thus contributes towards substantially reducing the performance of the cell.

SUMMARY OF THE INVENTION

This is why, in this context, one subject of the present invention is a novel solution for limiting the size of metal particles. It consists in using a chemical species which has the property of being readily and strongly adsorbed onto the metal in order to limit the growth of the particles and to promote the germination phases during the electroplating. Furthermore, this chemical species adsorbed onto the surface of the metal must be able to be readily desorbed (for example by electrochemical oxidation).

More specifically, one subject of the present invention is a process for manufacturing a catalytic, electrically conductive electrode based on metal particles, comprising a step of electroplating with a metal salt to form the said metal particles at the surface of an electrode, characterized in that:
the step of electroplating of the metal salt is performed in the presence of a blocking chemical species with a high power of absorption onto the surface of the said metal particles and with an oxidation potential higher than the reduction potential of the said metal salt:
  such that the blocking chemical species conserves its blocking power during the reduction reaction of the said metal salt, and
  so as to reduce the size of the metal particles formed, constituting the said catalytic, electrically conductive electrode;
a step of desorption of the blocking chemical species.

The strong absorption power may be characterized by the absence of peaks in the voltammogram i versus the applied tension E of Pt, the absence of these peaks in the voltammogram reflecting the blocking of the platinum adsorption sites by another species, the term "voltammogram" commonly used corresponding to the term "voltamperogram".

It is recalled that voltammetry is an electroanalysis method based on measurement of the current flow resulting from the reduction or oxidation of compounds present in solution under the effect of a controlled variation of the potential difference between two specific electrodes. It makes it possible to identify and to quantitatively measure a large number of compounds and also to study the chemical reactions including these compounds.

According to one variant of the invention, the metal is platinum.

According to one variant of the invention, the electrolytic deposition is performed in the presence of an $SO_2$ blocking chemical species.

According to one variant of the invention, the electrolytic deposition is performed in the presence of:
  an acidic $H_2PtCl_6$ solution;
  sulfuric acid;
  $Na_2SO_3$.

According to one variant of the invention, the electrolytic deposition is performed in the presence of a nitro blocking chemical species such as $NO_2^-$, $NO_2$, $NO_3^-$.

According to one variant of the invention, the electrolytic deposition is performed in the presence of a blocking chemical species of the type such as a sulfur compound such as $H_2S$.

According to one variant of the invention, the desorption of the blocking chemical species is performed by oxidation of the said species.

According to one variant of the invention, the oxidation step is performed by applying a potential that is sufficiently high relative to the equilibrium potential of the metal to be deposited, typically greater than about 0.76 $V_{ERH}$. Specifically, in this case where the Pt is deposited from the platinic acid salt whose equilibrium potential is:
  $Eeq_{PtCl_6^{2-}/Pt}$=0.76 $V_{ERH}$; the condition regarding the choice of the blocking species is that its oxidation potential should be greater than 0.76 $V_{ERH}$.

According to one variant of the invention, the oxidation step is performed by voltamperometric sweep in an acidic solution.

According to one variant of the invention, the oxidation step is performed by heat treatment.

According to one variant of the invention, the electrolytic deposition step is performed on a porous electrode.

According to one variant of the invention, the process also comprises the deposition of a microporous layer onto the surface of the porous electrode.

According to one variant of the invention, the process comprises the preparation of a hydrophilic surface on the electrode, prior to the electrolytic deposition.

According to one variant of the invention, the surface is made hydrophilic by depositing an ink based on carbon black, glycerol and a suspension of Nafion in isopropanol.

Thus, via the process of the invention, it is possible to reduce the size of the particles during the preparation of an electrode and notably of a fuel cell electrode. The process uses a chemical species that is known for its good absorption properties onto metal after having formed the first seeds by electroplating. These seeds become sites that are less favourable for growth and promote the formation of new metal particles.

The process of the invention thus has notably the following advantages:
  the size of the particles, since this is in theory independent of the metal charge since only the amount and the adsorbing power of the growth-inhibiting species should in principle have an influence on the size of the particles;
  the possibility of readily removing the blocking species notably by simple oxidation, this being done by observing in situ whether the surface of the electrode is totally free of blocking gas by monitoring the increase of the surface corresponding to a characteristic zone between 0.05 V and 0.3 $V_{ERH}$ on the electrochemical signature of a Pt electrode representing the adsorption and desorption of hydrogen onto Pt. The absence of these peaks on the voltammogram i versus E reflects the blocking of the adsorption sites with another species, of the platinum cycle after cycle;
  in the context of a fuel cell, and contrary to what is performed in the prior art in which the use of a viscous liquid may drastically affect the catalytic effects, the possibility of accessing the sites that are also involved for the reduction of oxygen, by means of using a gaseous species.

BRIEF DESCRIPTION OF THE DRAWINGS

The invention will be understood more clearly and other advantages will emerge on reading the description that follows, which is given in a non-limiting manner and by means of the attached figures, among which.

DETAILED DESCRIPTION

Figure 1:
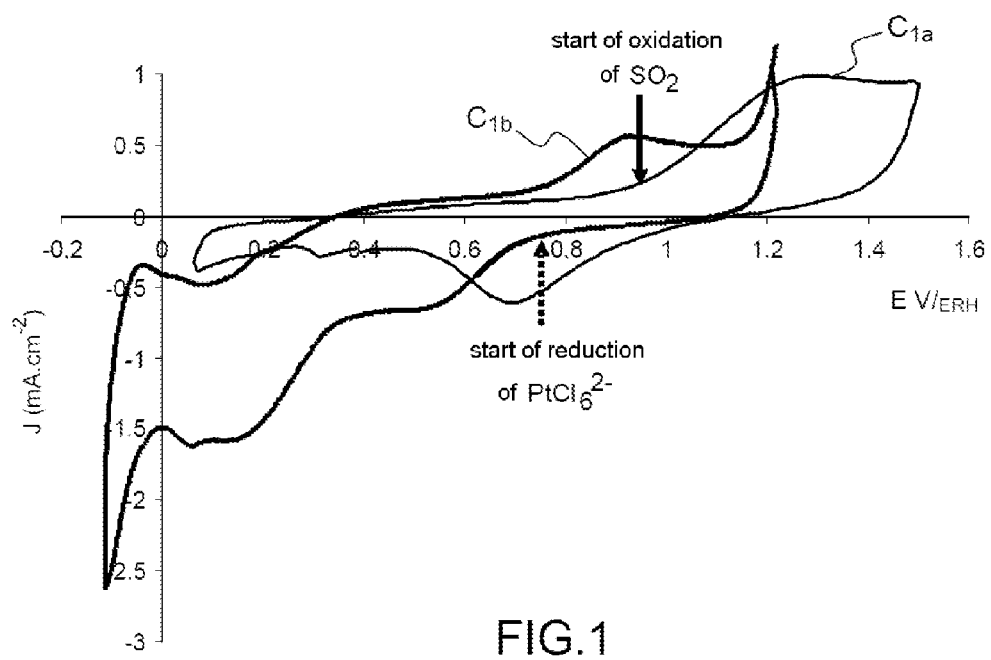
FIG. 1 illustrates the voltammetry curves of a solution of $H_2PtCl_6$ without blocking agent and the voltammogram of Pt in a 0.5 M $H_2SO_4$ solution with blocking agent ($SO_2$)

In general, the process of the invention requires the choice of potentials between the species to be deposited and the blocking chemical species. The metal to be deposited must have a lower reduction potential than the oxidation potential of the blocking chemical species. In comparison with $SO_2$, other gases may be capable of performing this role in the case of platinum.

Among these, mention may be made notably of nitro species such as: $NO_2^-$, $NO_2$, $NO_3^-$ which become oxidized at potentials above 0.9 $V_{ERH}$, as described in the article by Jean St-Pierre, Nengyou Jia, Reza Rahmani, *Journal of The Electrochemical Society*, 2008, 155, 4, B315-B32.

Similarly, sulfur compounds such as hydrogen sulfide ($H_2S$) whose oxidation potential is greater than 0.8 $V_{ERH}$ as presented in the article: R. Mohtadi, W.-k. Lee, S. Cowan, J. W. Van Zee, Mahesh Murthy, *Electrochemical and Solid-State Letters*, 2003, 6, 12, A272-A274, may also constitute an alternative for the dispersion of platinum particles during electroplating.

The Applicant specifies that sulfur dioxide ($SO_2$) is known to be irreversibly adsorbed at room temperature onto platinum with a degree of recovery of the platinum adsorption sites close to 1, as described in the articles by: Yannick Garsany et al. "Impact of Sulfur Dioxide on the Performance of the PEMFC Cathodes" ECS Transactions, 3 (1) 685-694 (2006) DOI: 10.1149/1.2356189] or by Jeremy J. Pietron et al. "Impact of sulfur dioxide on the performance of PEMFC cathode" ECS Transactions, 1 (8) 103-109 (2006); DOI: 10.1149/1.2214547 or by J. Fu et al./Journal of Power Sources 187 (2009) 32-38.

Similarly, it is known that hydrogen sulfide ($H_2S$) is also a compound that is irreversibly adsorbed onto the surface of platinum and thus blocks the reaction mechanisms at the surface thereof. Thus, the $H_2S$ adsorption kinetic constants for platinum ($kP_{H2S}$) measured at 50° C. are of the order of 0.0025 min$^{-1}$ with an activation energy of the order of 28 kJ.mol$^{-1}$ as described in the article by R. Mohtadi et al./ Applied Catalysis B: Environmental 56 (2005) 37-42]. The $H_2S$ adsorbed is oxidized above 0.98 V at 50° C.

It is also known that the nitrogen oxides $NO_2^-$, $NO_2$ and $NO_3^-$ are also potentially interesting, becoming oxidized at high potentials as described in the article by Jean Sait-Pierre et al. "PEMFC Contamination Model: Competitive Adsorption Demonstrated with $NO_2$" Journal of The Electrochemical Society, 155 4 B315-B320 (2008).

The studies by J. M. Moore et al. on the main contaminants of fuel cells, described in J. M. Moore et al. "The effects of battlefield contaminants on PEMFC performance" Journal of Power Sources 85 2000 254-260, give an idea of the contaminant compounds that may be used:
- CO allows virtually complete blocking (96%) of the platinum adsorption sites with 20 ppm in air;
- for the nitrogen oxides, an immobilization of all of the adsorption sites is obtained with only 400 ppb;
- for sulfur dioxide, 500 ppb are necessary to obtain the same result;
- propane may also be of interest, with total blocking of the sites with 90 ppm.

TABLE 2

Summary of the effect of the contaminants on fuel cell output

| Contaminant | Concentration | Percentage of original output during challenge | Percentage of original output during recovery |
|---|---|---|---|
| Carbon monoxide | 20 ppm | 96% | 100% |
| Nitrogen dioxide | 400 ppb | 100% | 100% |
| Sulphur dioxide | 500 ppb | 100% | 100% |
| Benzene | 50 ppm | 95% (50 mA/cm$^2$) | 95% |
| | | 93% (100 mA/cm$^2$) | |
| | | 72% (200 mA/cm$^2$) | |
| Propane | 90 ppm | 100% | 100% |
| RCN | 1780 ppm | 13% | 45% |
| BCN | 3560 ppm | 9% | 35% |
| CNCl | 780 ppm | 11% | 32% |
| CNCl | 1560 ppm | 12% | 50% |

TABLE 2-continued

Summary of the effect of the contaminants on fuel cell output

| Contaminant | Concentration | Percentage of original output during challenge | Percentage of original output during recovery |
|---|---|---|---|
| Sulphur mustard | 15 ppm | 13% | 13% |
| Sarin | 170 ppm | 30% | 30% |
| Sarin | 340 ppm | 23% | 23% |

As a function of the blocking chemical species chosen, the blocking sites and the growth sites may be different, which may lead to particles of different shapes. It thus becomes possible to improve the distribution and to control the size of the metal particles for a desired catalytic application as a function of the blocking chemical species.

It should moreover be noted that if CO is not adequate for platinum, it may prove to be advantageous for other metals such as copper, nickel or tin, inter alia, which have reduction potentials of less than 0.7 $V_{ERH}$.

Example of Implementation of the Process of the Invention

The electrochemical deposition takes place in an electroplating cell on a porous carbon support such as commercial diffusion layers (SGL "Gas Diffusion Layer" GDL from Sigracet™). The electroplating cell comprises a tantalum foam counterelectrode 1 cm away from the working electrode on which the deposition is performed.

An Ag/AgCl electrode is used as reference electrode. The electrolytic bath is composed of a 20 mM platinic acid $H_2PtCl_6$ solution diluted in 0.5 M sulfuric acid. 3.75 g of $Na_2SO_3$ are added to the electrolytic bath so as to obtain a saturated $SO_2$ solution according to the following reaction:

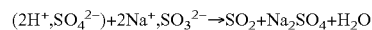

The novelty of the process lies in the choice of the inhibitory blocking chemical species. Specifically, in addition to being readily oxidizable in order to be able to efficiently clean the metal particles, the oxidation potential of this gas must be strictly greater than the reduction potential of the $PtCl_6^{2-}$ ions to Pt. If this condition is not satisfied, it is probable that the inhibitory gas becomes oxidized before the reduction of the platinum ions begins, in which case the blocking effect of the gas does not take place.

FIG. 1 illustrates the relevance of the choice of sulfur dioxide in this process. Specifically, it is clearly seen that the oxidation potential of $SO_2$ to $SO_4^{2-}$ takes place at 1 $V_{ERH}$ (the abbreviation ERH denoting a reference electrode), as shown by curve $C_{1a}$, which is substantially higher than the reduction potential of the Pt ions (curve $C_{1a}$), in the presence of the following reaction:

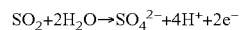

Curve $C_{1b}$ shows the change in the measurement by voltammetry in a 20 mM solution of $H_2PtCl_6$ in the absence of the species $SO_2$.

Consequently, the contaminant effect of $SO_2$ is not affected during the reduction of the platinum ions.

By way of example, the various steps of a process example of the invention are represented schematically in FIGS. 2a, 2b, 2c and 2d.

Starting with an electrode that may be a porous carbon diffusion layer $C_1$, a microporous layer $C_2$ is deposited, the porosity of which is adapted to the envisaged application, in this example that of the fuel cell. This microporous layer may typically comprise a binder and carbon powder, but has the drawback of being hydrophobic. A surface treatment is then performed to make the said layer hydrophilic, with deposition of a layer $C_3$ of ink type as illustrated in FIG. 2a.

To this end, a first diffusion layer $C_1$ that may be a commercial diffusion layer SGL of 25 cm² is treated to make the surface hydrophilic. This treatment consists in spraying, as illustrated in FIG. 2b, an ink $C_3$ of which the mass ratio of the various constituents is as follows: 1/0.5/45/1 for carbon black (CB), Nafion, isopropanol and glycerol, respectively. This deposit is then placed in an oven for total evaporation of the solvents at 80° C. for 30 minutes.

Figures 2A, 2B, 2C, 2D:
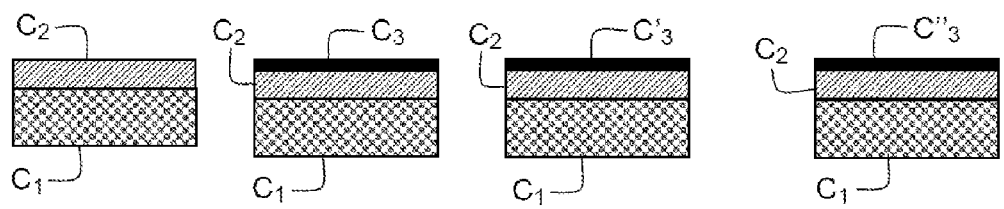
FIGS. 2a, 2b, 2c and 2d illustrate the various steps of an example of the process of the invention.

Pt is then deposited electrochemically as illustrated in FIG. 2c, forming a layer $C'_3$ of Pt particles.

Figure 3:
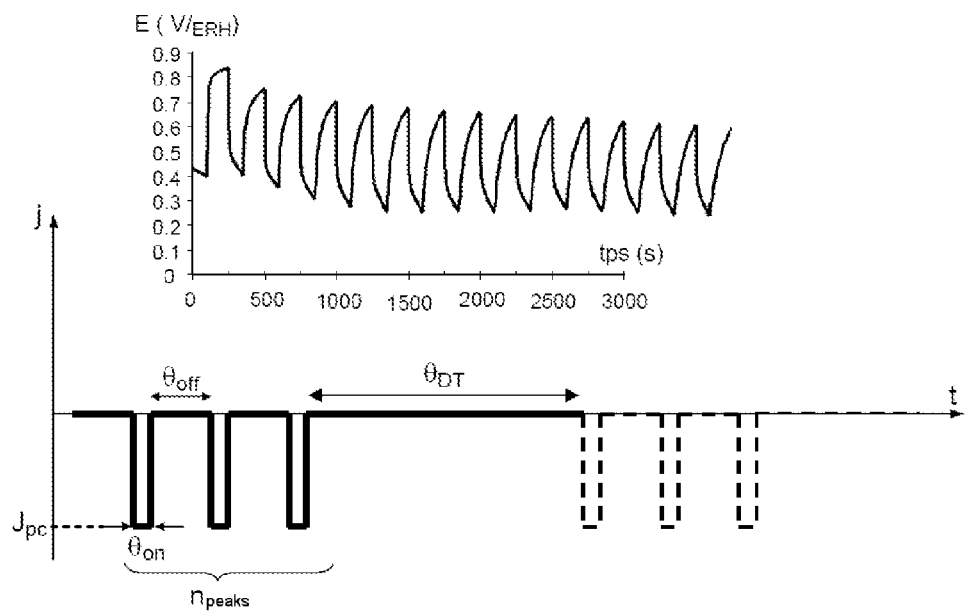
FIG. 3 illustrates the curve of the voltage measured as a function of time, with regard to an applied pulsed signal.

The deposition is performed in the electrolytic bath described previously, by controlling the current with a pulsed signal as illustrated in FIG. 3.

The signal consists in applying a "pulsed" current whose parameters are as follows:
  $j_{pc}$ is the current applied during the pulse: 100 mA/cm²
  $\theta_{on}$ is the pulse time and is equal to: 10 ms
  $\theta_{off}$ is the time between two pulses: 180 ms
  $n_{peaks}$ is the number of pulses; in this example it is 24

Once the number of peaks has been reached, the signal is stopped to allow the system to return to an equilibrium state. During this relaxation period, the $PtCl_6^{2-}$ concentration returns to a non-zero value in the region of the electrode. This relaxation time noted $\theta_{DT}$ is 45 seconds.

The repetition of these signals noted $n_{100}$ (pulsed signal+ relaxation time) is 10.

FIG. 3a is a representation of the pulsed signal followed by the relaxation time. The voltage response to this galvanic signal is represented in FIG. 3b where each drop in voltage corresponds to the signal (pulsed current) and each jump in voltage corresponds to the time at which the pulsed signal is stopped (relaxation time).

The values of the various parameters are dictated after a parametric analysis and also as a function of Faraday's law.

$$q = \frac{Q}{S} = \left(\frac{i}{S} \times \vartheta_{on} \times n_{peaks}\right) \times n_{loops} = (j \times \vartheta_{on} \times n_{peaks}) \times n_{loops} = 0.24 \text{ C/cm}^2$$

In order to reduce the size of the particles, the deposition signal may be applied twice, by spraying 1 ml of hydrophilic ink between two depositions.

This thus leads to the use of a charge of 0.48 C/cm², which leads to a theoretical platinum charge of 0.24 $mg_{Pt}$/cm².

Given the saturation of the electrolyte with $SO_2$ as the Pt deposit forms at the surface of the diffusion layer, sulfur dioxide, which is known for its adsorbent power on platinum, becomes attached to the metal particles thus formed, leading to the formation of a layer $C_3'$. This forces a greater distribution of the platinum particles, since the growth of Pt is blocked at the surface of the platinum seeds entirely covered with $SO_2$.

This inhibitory property of $SO_2$ which is unfavourable for the catalysis of oxygen reduction becomes an advantage for better distribution of the metal particles prepared by electroplating.

Once the deposition is finished, the $SO_2$ needs to be oxidized in order to recover the entire surface of Pt available in order to obtain the largest possible catalytic surface, and to form the modified layer $C_3''$ as illustrated in FIG. 2d.

Figure 4:
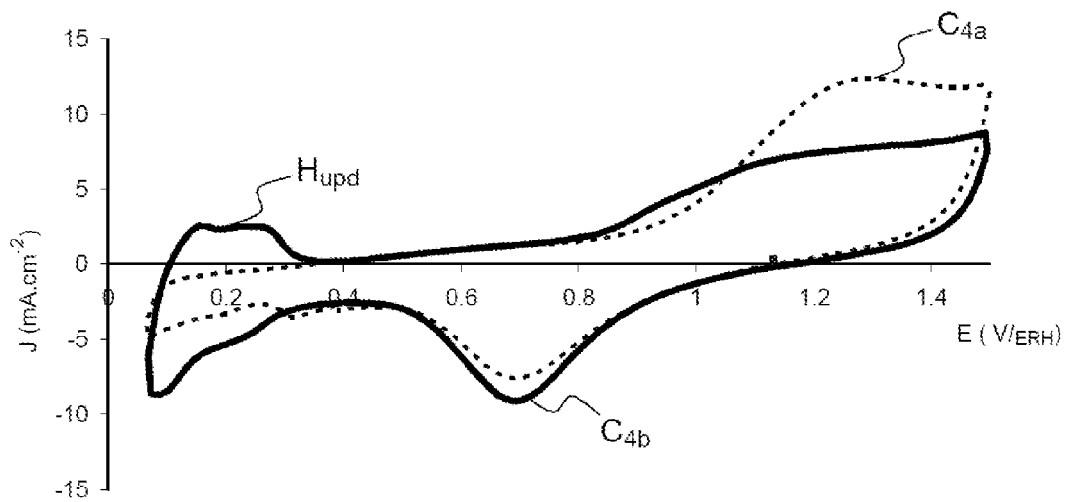
FIG. 4 illustrates the effect of the oxidation of $SO_2$ on the electrochemical response of platinum.
Figure 5:
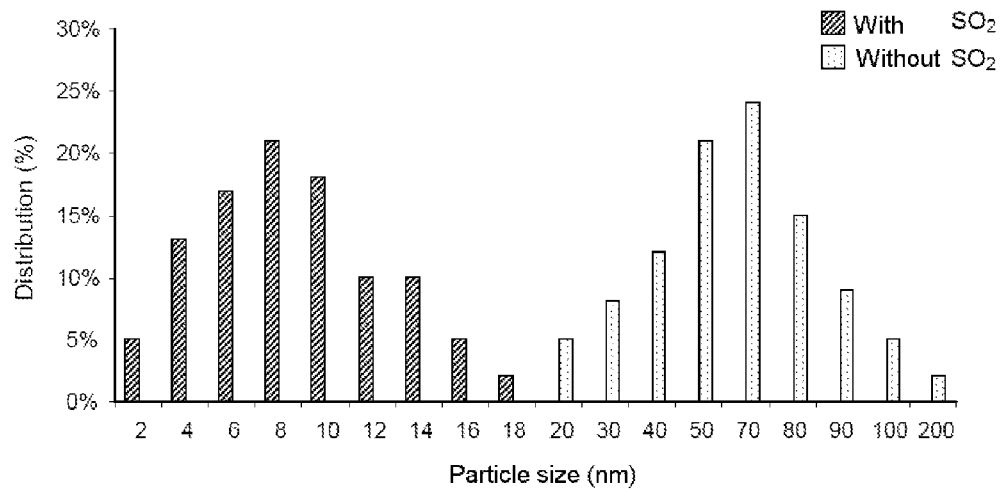
FIG. 5 illustrates the size of the Pt particles obtained without and with the blocking chemical species $SO_2$ in the electrolytic bath.
Figure 6:
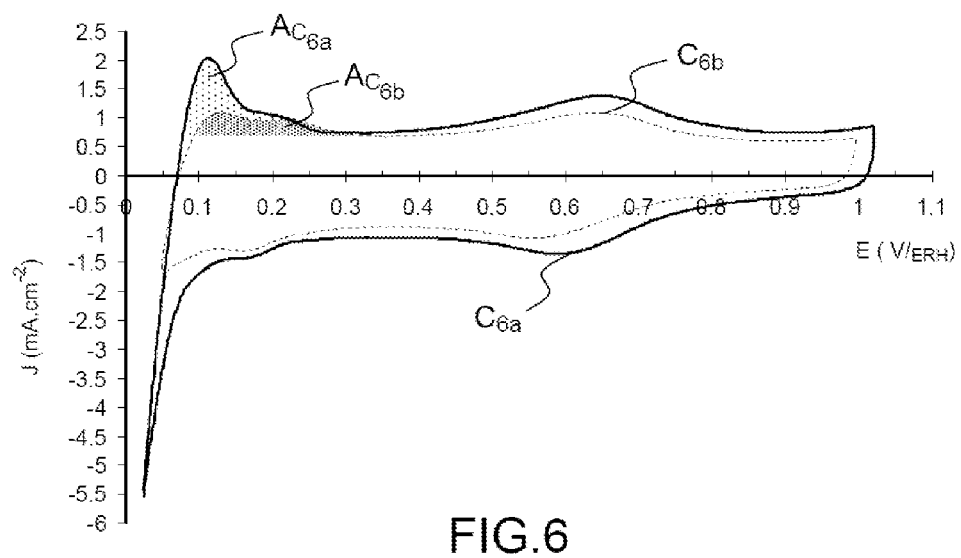
FIG. 6 illustrates the comparison of the voltammetry curves for the electrodes obtained by electroplating with and without the blocking chemical species $SO_2$.

The oxidation of $SO_2$ is performed by simple voltamperometric sweep at 20 mV/s between $-50$ $mV_{ERH}$ and 1400 $mV_{ERH}$ in a 0.5 M sulfuric acid solution saturated with an inert gas such as nitrogen. After a few cycles, the signal i versus E becomes stable and the electrochemical signature of the Pt is clearly observable. It may then be considered that the sulfur dioxide is totally oxidized to sulfate in the 0.5 M $H_2SO_4$ solution as shown in FIG. 4. The presence of Pt particles at the surface of the diffusion layer makes it possible to obtain an electrode that will then need to undergo a heat treatment in order to remove the traces of glycerol present in the active layer. Curve $C_{4a}$ relates to a first cycle, Figure $C_{4b}$ relates to a final cycle for completely removing the preadsorbed $SO_2$, thus showing that in situ if the surface of the electrode is totally free of blocking gas, the increase of the surface $H_{upd}$ corresponding to a characteristic zone between 0.05 V and 0.3 $V_{ERH}$ may be monitored on the electrochemical signature of a Pt electrode representing the adsorption and desorption of hydrogen onto Pt. The absence of these peaks on the voltammogram i versus E reflects the blocking of the adsorption sites by another species, of the platinum cycle after cycle. As shown in FIG. 5, by comparing a deposition process with and without the presence of the blocking chemical species $SO_2$, a reduction in the mean size of the particles by a factor of 8 is observed. Consequently, at an equivalent charge (the charge being estimated from Faraday's law, it is assumed that under the same conditions at the same coulomb charge, the same Pt charge is obtained), but with smaller particle sizes, the active surface (greyed zone) is larger, as may be observed in FIG. 6. Curve $C_{6a}$ relates to a deposition performed with a blocking species, and curve $C_{6b}$ relates to a deposition performed without blocking species. The areas $A_{C6a}$ and $A_{C6b}$ are representative of the sizes of the metal particles thus formed for a given X-axis, the larger the area, the smaller the particle size.

The invention claimed is:

1. A process for manufacturing a catalytic, electrically conductive electrode based on metal particles, comprising:
  electroplating with a metal salt to form the metal particles at the surface of an electrode,
  wherein the metal is platinum and the electroplating of the metal salt is performed in the presence of a nitro blocking chemical species with a high power of absorption onto the surface of the metal particles and with an oxidation potential higher than the reduction potential of the metal salt:
    such that the blocking chemical species conserves its blocking power during the reduction reaction of the metal salt, and
    so as to reduce the size of the metal particles formed, constituting the catalytic, electrically conductive electrode;
  the process further comprising desorption of the blocking chemical species.

2. The process for manufacturing a catalytic, electrically conductive electrode based on metal particles according to claim 1, wherein the nitro blocking chemical species comprises at least one of $NO_2^-$, $NO_2$, and $NO_3^-$.

3. The process for manufacturing a catalytic, electrically conductive electrode based on metal particles according to claim 1, wherein the cleaning of the blocking chemical species is performed by oxidation of the said species.

4. The process for manufacturing a catalytic, conductive electrode based on metal particles according to claim 3, wherein the oxidation is performed by applying a sufficiently high potential greater than about 0.76 $V_{ERH}$.

5. The process for manufacturing a catalytic, electrically conductive electrode according to claim 4, wherein the oxidation is performed by voltamperometric sweep in an acidic solution.

6. The process for manufacturing a catalytic, conductive electrode based on metal particles according to claim 3, wherein the oxidation is performed by heat treatment.

7. The process for manufacturing a catalytic, electrically conductive electrode according to claim 1, wherein the electrolytic deposition is performed on a porous electrode.

8. The process for manufacturing a catalytic, electrically conductive electrode according to claim 7, further comprising the deposition of a microporous layer on the surface of the porous electrode.

9. The process for manufacturing a catalytic, electrically conductive electrode according to claim 7, further comprising the preparation of a hydrophilic surface on the electrode, prior to the electrolytic deposition.

10. The process for manufacturing a catalytic, electrically conductive electrode according to claim 9, wherein the surface is made hydrophilic by depositing an ink based on carbon black and alcohol.

\* \* \* \* \*